United States Patent
Murakami

(10) Patent No.: US 10,139,481 B2
(45) Date of Patent: Nov. 27, 2018

(54) RADIO COMMUNICATION SYSTEM AND DISTANCE MEASURING METHOD

(71) Applicant: TOYOTA JIDOSHA KABUSHIKI KAISHA, Toyota-shi, Aichi-ken (JP)

(72) Inventor: Hiroko Murakami, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 209 days.

(21) Appl. No.: 15/026,358

(22) PCT Filed: Oct. 3, 2014

(86) PCT No.: PCT/IB2014/002218
§ 371 (c)(1),
(2) Date: Mar. 31, 2016

(87) PCT Pub. No.: WO2015/049583
PCT Pub. Date: Apr. 9, 2015

(65) Prior Publication Data
US 2016/0231421 A1    Aug. 11, 2016

(30) Foreign Application Priority Data
Oct. 4, 2013   (JP) ................................. 2013-209169

(51) Int. Cl.
*G01S 3/02* (2006.01)
*G01S 11/06* (2006.01)
(Continued)

(52) U.S. Cl.
CPC ............ *G01S 11/06* (2013.01); *B60R 25/245* (2013.01); *G01S 5/14* (2013.01); *G08B 21/0247* (2013.01)

(58) Field of Classification Search
CPC ......... G01S 11/06; G01S 5/14; B60R 25/245; G08B 21/0247
(Continued)

(56) References Cited

U.S. PATENT DOCUMENTS 6,208,239 B1 * 3/2001 Muller ................... B60R 25/24
340/10.1
6,747,545 B2 * 6/2004 Nowottnick ....... G07C 9/00309
340/5.61

(Continued)

FOREIGN PATENT DOCUMENTS

DE         10202330 A1   7/2003
JP       2002-077972 A   3/2002
(Continued)

*Primary Examiner* — Chuong P Nguyen
(74) *Attorney, Agent, or Firm* — Sughrue Mion, PLLC

(57) ABSTRACT

A radio communication system, in which radio communication is carried out between an in-vehicle communication device, mounted in a vehicle, and a radio communication terminal to detect a relative distance therebetween, includes an output control unit that controls a radio wave intensity of a measuring signal, which is sent from one of the in-vehicle communication device and the radio communication terminal, at a pre-set predetermined value; and a measuring unit that performs distance measuring on a vehicle side based on the radio wave intensity of the measuring signal controlled at the predetermined value or on a signal to which a value of the radio wave intensity of the measuring signal is added as information.

6 Claims, 8 Drawing Sheets

(51) Int. Cl.
*B60R 25/24* (2013.01)
*G08B 21/02* (2006.01)
*G01S 5/14* (2006.01)

(58) Field of Classification Search
USPC ......... 342/458; 340/539.21, 539.23; 701/300
See application file for complete search history.

(56) References Cited

U.S. PATENT DOCUMENTS

| | | | | |
|---|---|---|---|---|
| 7,224,980 | B2* | 5/2007 | Hara | B60R 25/24 340/10.1 |
| 8,232,897 | B2* | 7/2012 | Tieman | G01S 1/66 340/990 |
| 8,401,713 | B2* | 3/2013 | Kellum | G01S 11/10 700/1 |
| 8,896,418 | B2* | 11/2014 | Lickfelt | H04B 17/29 340/5.61 |
| 2002/0025823 | A1 | 2/2002 | Hara | |
| 2004/0207510 | A1* | 10/2004 | Buchner | B60R 25/24 340/5.61 |
| 2007/0162191 | A1* | 7/2007 | Matsubara | G07C 9/00309 701/1 |
| 2009/0264082 | A1 | 10/2009 | Tieman et al. | |
| 2010/0201483 | A1* | 8/2010 | Nakajima | B60R 25/245 340/5.61 |
| 2011/0148569 | A1 | 6/2011 | Froitzheim | |
| 2013/0257643 | A1* | 10/2013 | Inomata | G01S 13/931 342/70 |
| 2014/0045531 | A1 | 2/2014 | Kessoku et al. | |
| 2016/0304056 | A1* | 10/2016 | Miyazawa | G07C 9/00309 |

FOREIGN PATENT DOCUMENTS

| | | |
|---|---|---|
| JP | 2005-328231 A | 11/2005 |
| JP | 2010-062736 A | 3/2010 |
| JP | 2010-516925 A | 5/2010 |
| JP | 2012-007971 A | 1/2012 |
| WO | 01/89887 A1 | 11/2001 |
| WO | 2008/090158 A1 | 7/2008 |
| WO | 2013/039830 A1 | 3/2013 |

* cited by examiner

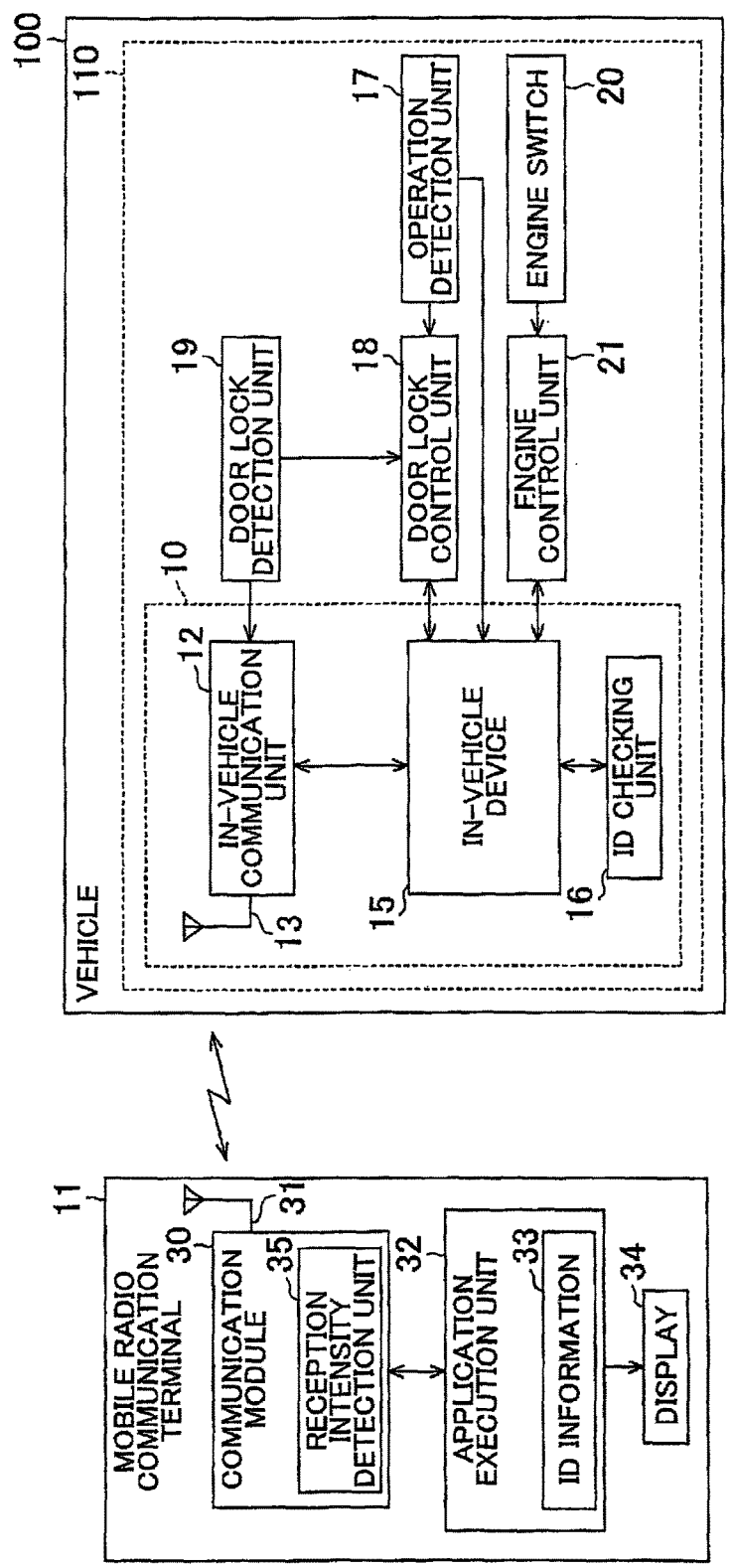
F I G . 4

RADIO COMMUNICATION SYSTEM AND DISTANCE MEASURING METHOD

BACKGROUND OF THE INVENTION

1. Field of the Invention

The present invention relates to a radio communication system and a distance measuring method.

2. Description of the Related Art

As a system for carrying out radio communication between an in-vehicle communication device and a user-owned radio communication terminal, a system is already known that can locks/unlocks the door of a vehicle without using a mechanical key. According to this system, when a user carrying an electronic key approaches the vehicle, the in-vehicle communication device checks the ID code of the electronic key. When the validity of the electronic key is successfully authenticated as a result of the checking and the electronic key enters a predetermined distance range from the vehicle position, the vehicle can be unlocked without having to insert the mechanical key into the cylinder lock of the vehicle. As an electronic key, though only a terminal conforming to the specification of the in-vehicle communication device is used today, study has been conducted on the use of a user-owned general-purpose radio communication device.

Meanwhile, the relative distance not only between an in-vehicle communication device and a radio communication terminal such as an electronic key but also between any two devices that carry out radio communication with each other is calculated in many cases based on the reception radio wave intensity of the radio signal. For example, Japanese Patent Application Publication No. 2005-328231 (JP 2005-328231 A) discloses a system in which the relative distance is detected by a radio terminal device that wirelessly communicates with a fixed access point. The radio terminal device receives a radio signal sent from the access point, detects its radio wave intensity and, based on the detected reception radio wave intensity, estimates the distance to the access point. In addition, based on the distance estimated in this manner, the radio terminal device determines the radio wave intensity of radio communication via which it sends a signal and, at the same time, gradually increases the level of the determined sending radio wave intensity.

However, in a radio communication system composed of an in-vehicle communication device and a mobile radio communication terminal, the following problem may arise. That is, when the in-vehicle communication device measures the distance by communicating with the mobile radio communication terminal that has the function to make variable the sending radio wave intensity as with the device described in the above document, the relative distance between them may be incorrectly detected. In other words, it is difficult to measure the distance when a general-purpose radio communication terminal is used as a terminal that wirelessly communicates with an in-vehicle communication device.

SUMMARY OF THE INVENTION

The present invention provides a radio communication system and a distance measuring method capable of measuring the distance to a radio communication terminal even when general-purpose radio communication is used.

A first aspect of the present invention relates to a radio communication system in which radio communication is carried out between an in-vehicle communication device, mounted in a vehicle, and a radio communication terminal to detect a relative distance therebetween. The radio communication system includes an output control unit that controls a radio wave intensity of a measuring signal at a pre-set predetermined value, the measuring signal being sent from one of the in-vehicle communication device and the radio communication terminal; and a measuring unit that performs distance measuring on a vehicle side based on the radio wave intensity of the measuring signal controlled at the predetermined value or on a signal to which a value of the radio wave intensity of the measuring signal is added as information.

A second aspect of the present invention relates to a distance measuring method for carrying out radio communication between an in-vehicle communication device, mounted in a vehicle, and a radio communication terminal to detect a relative distance therebetween. The distance measuring method of the radio communication system includes controlling a radio wave intensity of a measuring signal at a pre-set predetermined value, the measuring signal being sent from one of the in-vehicle communication device and the radio communication terminal; and performing distance measuring on a vehicle side based on the radio wave intensity of the measuring signal controlled at the predetermined value or on a signal to which a value of the radio wave intensity of the measuring signal is added as information.

According to the aspects described above, the radio wave intensity of the measuring signal is controlled at a pre-set intensity and, then, distance measuring is performed based on the radio wave intensity of the measuring signal or on a signal to which the radio wave intensity of the measuring signal is added as information. This configuration therefore allows distance measuring to be performed even for a radio communication terminal that has the general-purpose communication function that makes variable the sending radio wave intensity.

In the first aspect described above, the output control unit may send an output intensity maintaining request that requests a sending radio wave intensity of the radio communication terminal be maintained at a predetermined intensity and the measuring unit, provided in the in-vehicle communication device, may calculate a distance to the radio communication terminal based on a reception radio wave intensity of a response signal that is sent from the radio communication terminal with the predetermined intensity.

In the second aspect described above, with the use of an output control unit that requests that a sending radio wave intensity of the radio communication terminal be maintained at a predetermined intensity; and a measuring unit that, provided in the in-vehicle communication device, performs distance measuring based on the radio wave intensity of the measuring signal controlled at the predetermined value, the distance measuring method may include sending, by the output control unit, an output intensity maintaining request that requests that the sending radio wave intensity of the radio communication terminal be maintained at a predetermined intensity; sending, by the radio communication terminal, a response signal with the sending radio wave intensity maintained at a predetermined intensity; and calculating, by the distance measuring unit, a distance to the radio communication terminal based on a reception radio wave intensity of the response signal sent from the radio communication terminal.

According to the aspects described above, after the above-described output control signal is received, the sending radio wave intensity of the radio communication terminal becomes constant. This configuration therefore allows distance measuring to be performed even for a radio communication terminal that has the general-purpose communication function that makes variable the sending radio wave intensity.

In the first aspect described above, the output control unit may send the output intensity maintaining request to an authenticated radio communication terminal. According to this aspect, the above-described output control signal is sent only to an authenticated radio communication terminal. This configuration therefore prevents unnecessary output control from being performed for a radio communication terminal that is present around the vehicle but is not authenticated.

In the first aspect described above, the output control unit, provided outside the vehicle, may send the output intensity maintaining request to all the radio communication terminals each of which has identification information indicating that the radio communication terminal is capable of communicating with the in-vehicle communication device.

According to this aspect, the above-described output control signal is sent to all the radio communication terminals each of which has the above-described identification information. This configuration therefore prevents the request, which sets the sending radio wave intensity to a predetermined level, from being sent at least to a mobile radio communication terminal that has not the identification information.

In the first aspect described above, the output control unit, provided in the in-vehicle communication device, may send a request signal with a predetermined radio wave intensity, the request signal requesting for a response signal from the radio communication terminal and, when the request signal is received from the in-vehicle communication device, the radio communication terminal may detect a reception radio wave intensity of the request signal and send the response signal as the measuring signal, the response signal including the detected reception radio wave intensity as the information.

In the second aspect described above, with the use of an output control unit that, provided in the in-vehicle communication device, sends a request signal with a predetermined intensity, the request signal requesting for a response signal from the radio communication terminal; and a distance measuring unit that, provided in the in-vehicle communication device, performs distance measuring based on a signal to which the value of the radio wave intensity of the measuring signal is added as the information, the distance measuring method may include sending, by the output control unit, the request signal with a predetermined intensity; detecting, by the radio communication terminal, a reception radio wave intensity of the request signal and then sending the response signal including the reception radio wave intensity; and calculating, by the distance measuring unit, a distance to the radio communication terminal based on the reception radio wave intensity included in the response signal.

According to these aspects, the reception intensity of a radio wave sent from the in-vehicle communication device to the radio communication terminal with a predetermined intensity is detected by the radio communication terminal and its intensity information is returned to the in-vehicle communication device. Therefore, distance measuring may be performed on the vehicle side without having to control the sending radio wave intensity of the radio communication terminal. This configuration therefore allows distance measuring to be performed even for a radio communication terminal that has the general-purpose communication function that makes variable the sending radio wave intensity.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a block diagram showing a general configuration of an in-vehicle radio communication system and a mobile radio communication terminal in a second embodiment of a radio communication system and its distance measuring method of the present invention;

DETAILED DESCRIPTION OF EMBODIMENTS (First Embodiment)

A first embodiment is described below in which a radio communication system for vehicles and the distance measuring method used in the radio communication system are embodied.

Figure 1:
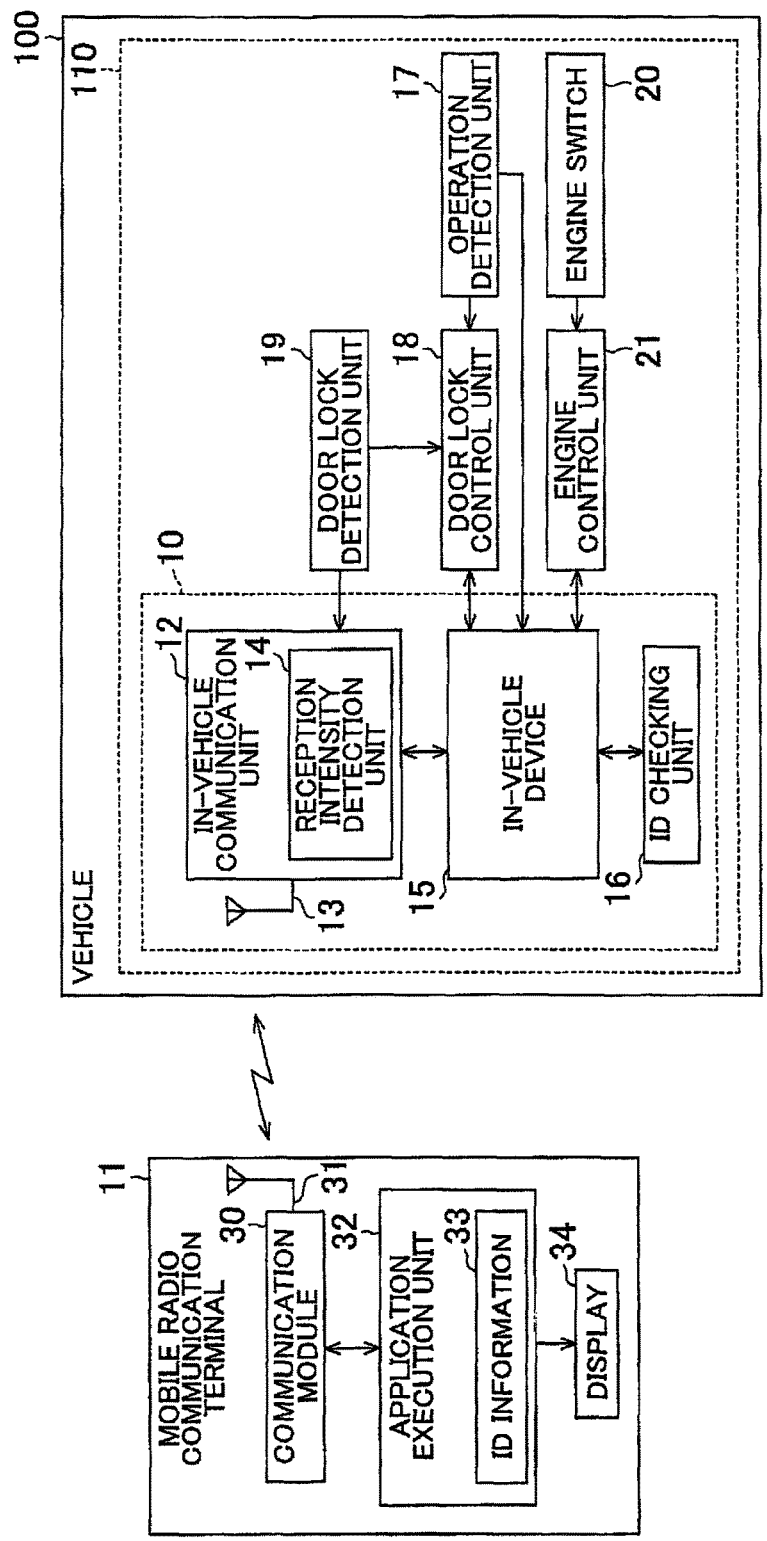
FIG. 1 is a block diagram showing a general configuration of an in-vehicle radio communication system and a mobile radio communication terminal in a first embodiment of a radio communication system and its distance measuring method of the present invention.

As shown in FIG. 1, a vehicle 100 in which the radio communication system and the radio communication method, both specifically designed for vehicles, are used is equipped with an electronic key system 110. This electronic key system 110 is used for radio communication with a mobile radio communication terminal 11. The mobile radio communication terminal 11 in this embodiment is a multi-function phone (smartphone) connectable to a general-purpose communication network with its function varying according to the machine type.

The electronic key system 110 includes an in-vehicle communication device 10 that wirelessly communicates with the mobile radio communication terminal 11. The in-vehicle communication device 10 includes an in-vehicle communication unit 12 that performs radio communication, an in-vehicle device 15 that acts as an output control unit and a distance measuring unit, and an ID checking unit 16 that authenticates the mobile radio communication terminal 11. In this embodiment, the in-vehicle communication unit 12, a communication unit for radio communication according to a protocol based on the Bluetooth (registered trademark) standard, communicates with an external radio communication terminal conforming to the standard. The in-vehicle communication unit 12 includes an in-vehicle communication antenna 13 and a reception intensity detection unit 14 that detects the reception radio wave intensity of a signal sent from the mobile radio communication terminal 11. The in-vehicle communication unit 12 outputs a radio signal, the maximum communication distance of which is 10 m to 100 m (for example, class 1 to class 2), to the in-vehicle communication antenna 13.

The ID checking unit 16 checks the ID information, received from the mobile radio communication terminal 11, with the registered ID information on the vehicle. The ID checking unit 16 outputs the checking result to the in-vehicle device 15. If it is determined as a result of the checking that the mobile radio communication terminal 11 is authentic, the in-vehicle device 15 performs an operation, such as door locking/unlocking and engine start, in response to an operation performed by the user.

As devices for locking and unlocking the door, the vehicle 100 includes an operation detection unit 17 that detects whether the user operates the door handle, a door lock control unit 18 that controls the locking/unlocking of the door, and a door lock detection unit 19. The operation detection unit 17 detects that the user operates the door handle, provided outside the door of the vehicle 100, and Outputs the detection information to the door lock control unit 18 and the in-vehicle device 15. The door lock detection unit 19 detects the locking/unlocking of the door and outputs the detection information to the door lock control unit 18 and the in-vehicle communication unit 12.

If the mobile radio communication terminal 11 is successfully authenticated, the in-vehicle device 15 sends an output intensity maintaining request, which includes a command that maintains the output to the antenna at a predetermined output level, to the authenticated mobile radio communication terminal 11. This request causes the authenticated mobile radio communication terminal 11 to control the output of the antenna at a predetermined output level, thus making it possible to measure the distance based on the radio wave intensity received by the in-vehicle communication unit 12. That is, if the mobile radio communication terminal 11 is successfully authenticated and if the distance from the vehicle 100 is the same, the reception radio wave intensity is the same regardless of the device type. Based on the reception radio wave intensity detected by the in-vehicle communication unit 12, the in-vehicle device 15 references the table or the map, which associates reception radio wave intensity with a relative distance to the communication terminal, to detect the relative distance to the mobile radio communication terminal 11.

If the mobile radio communication terminal 11 is successfully authenticated and if the relative distance between the authenticated mobile radio communication terminal 11 and the vehicle 100 is equal to or shorter than a predetermined distance, the in-vehicle device 15 unlocks the door at the time the door handle is operated. Similarly, if the mobile radio communication terminal 11 is successfully authenticated and if the relative distance between the authenticated mobile radio communication terminal 11 and the vehicle 100 is longer than a predetermined distance, the in-vehicle device 15 locks the door. The door lock detection unit 19 detects the locking and unlocking of the door and sends the detection result to the mobile radio communication terminal 11 via the in-vehicle communication unit 12.

In addition, the vehicle 100 includes an engine switch 20 that starts or stops the engine and an engine control unit 21 that controls the engine. If the mobile radio communication terminal 11 is successfully authenticated and if the relative distance between the authenticated mobile radio communication terminal 11 and the vehicle 100 is equal to or shorter than a predetermined distance, the in-vehicle device 15 outputs a start request to the engine control unit 21 at the time the engine switch 20 is turned on.

Next, the configuration of the mobile radio communication terminal 11 is described below. The mobile radio communication terminal 11 includes a communication module 30, an application execution unit 32, and a display 34. The communication module 30 is a module that communicates with an external. radio communication terminal via a communication antenna 31 according to a protocol based on the Bluetooth (registered trademark) standard. In the communication between the in-vehicle communication unit 12 and the mobile radio communication terminal 11 in this embodiment, the in-vehicle communication unit 12 acts as a master (master unit) and the mobile radio communication terminal 11 acts as a slave (slave unit). Once a slave ID is assigned and pairing with the in-vehicle communication unit 12 is established, the communication module 30 responds only to a command to which the slave ID is assigned.

The communication module 30. makes variable the output to the communication antenna 31, for example, to change the effective communication distance range. For example, to extend the communication. distance range, the communication module 30 increases the output to the communication antenna to increase the sending radio wave intensity; conversely, to reduce the communication distance range, the communication module 30 decreases the output to the communication antenna to decrease the sending radio wave intensity.

The application execution unit 32 wirelessly communicates. with the in-vehicle communication unit 12 to execute an application that causes the electronic key system to function. This application is installed by the user in advance. The application execution unit 32 sends registered ID information 33 to the in-vehicle communication device 10 in response to an ID request from the in-vehicle communication unit 12. In addition, when an output control signal from the in-vehicle communication unit 12 is received via the communication module 30, the application execution unit 32 controls the output, sent from the communication module 30 to the communication antenna 31, at a predetermined output level.

Figure 2:
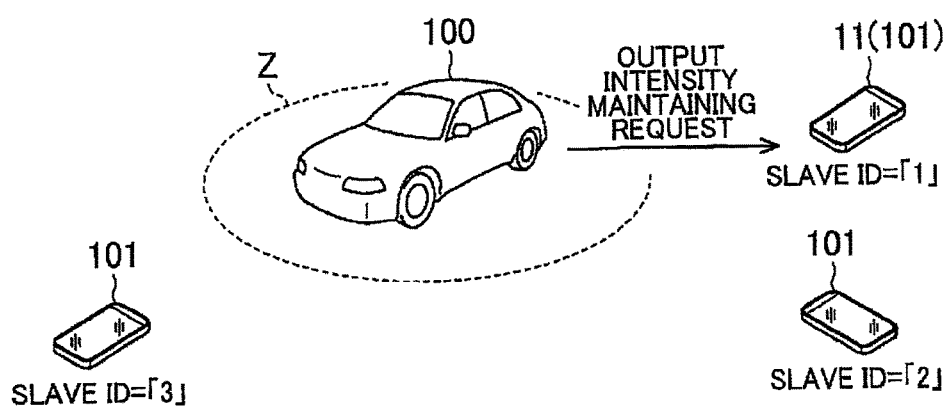
FIG. 2 is a schematic diagram showing a method of radio communication between a radio communication system and a mobile radio communication terminal in the embodiment.
Figure 3:
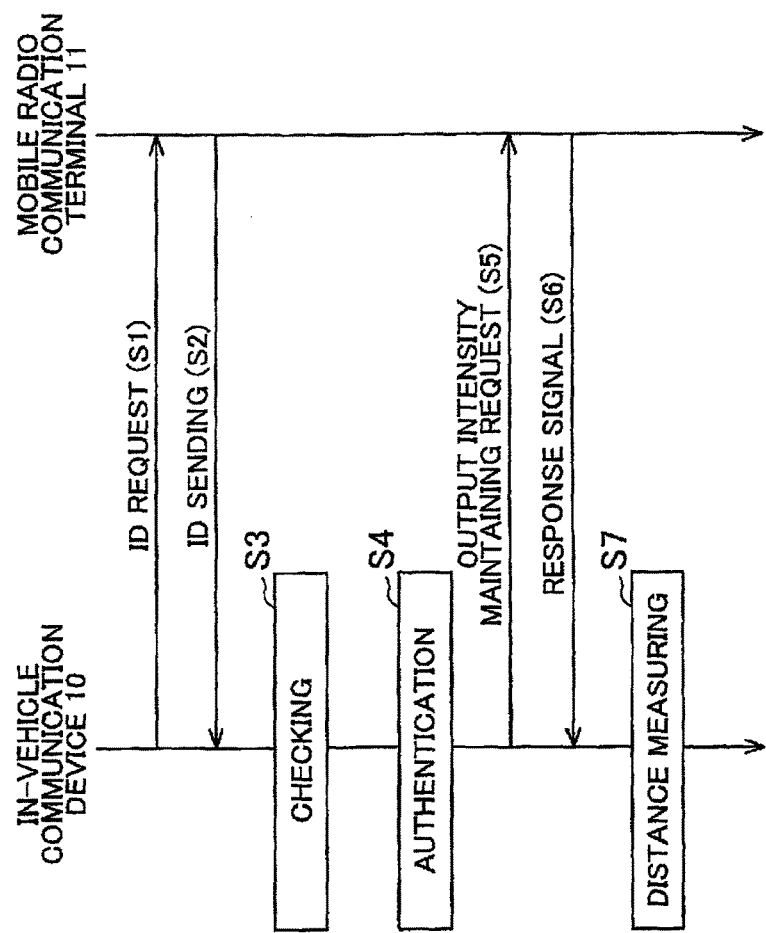
FIG. 3 is a sequence chart showing a procedure of radio communication performed by an in-vehicle communication device and a mobile radio communication terminal in the embodiment.

Next, with reference to FIG. 2 and FIG. 3, the following describes the operation performed by the in-vehicle communication device 10 to measure the distance to the mobile radio communication terminal 11. First, if the distance measuring start condition is satisfied, for example, if the vehicle 100 is parked, the in-vehicle device 15 starts the in-vehicle communication unit 12 described above. The in-vehicle communication unit 12, once started, sends a signal for detecting a slave to detect an external radio communication terminal around the vehicle.

If external radio communication terminals 101, which are a slave, is detected around the vehicle as shown in FIG. 2, the in-vehicle communication device 10 assigns a slave ID to the external radio communication terminal 101 and establishes pairing with the detected external radio communication terminals 101. In this case, the in-vehicle communication device 10 can also acquire the profile that indicates the devices provided on the external radio communication terminal 101 and the, function of the terminal.

Next, as shown in FIG. 3, the, in-vehicle device 15 sends an ID request, which requests for the ID information 33 on the electronic key system, to one or more external radio communication terminals 101 via the in-vehicle communication unit 12 (step S1). At this time, if the profile is acquired as described above and the mobile radio communication terminal 11 that has an application for the electronic key system is already identified, the in-vehicle device 15 sends an ID request with the slave ID of that terminal specified. Conversely, if the mobile radio communication terminal 11 that has an application for the electronic key system is not identified, the in-vehicle device 15 sends an ID request to all external radio communication terminals 101.

When the ID request is received, the mobile radio communication terminal 11 sends the ID information 33 to the in-vehicle device 15 with its slave ID attached to the ID information 33 (step S2). For example, even when an ID request is sent to all external radio communication terminals 101 in step S1, only the mobile radio communication terminal 11 having the ID information 33 responds to the ID request.

When the ID information 33 is received, the in-vehicle device 15 checks the ID information 33 using the ID checking unit 16 (step S3). If it is authenticated as a result of the checking that the ID information 33 is valid (step S4), the in-vehicle communication device 10 sends the above-described output intensity maintaining request with the slave ID of the authenticated mobile radio communication terminal 11 specified for the request (step S5).

At this time, the output intensity maintaining request is sent only to the authenticated mobile radio communication terminal 11 as shown in FIG. 2. Therefore, the output control is not performed for the mobile radio communication terminal 11 that has no application for the electronic key system and for the mobile radio communication terminal 11 that has the application but is not authenticated. This prevents unnecessary output control from being performed for the external radio communication terminal 101.

As shown in FIG. 3, when the above-described output intensity maintaining request is received via the communication module 30, the application execution unit 32 of the mobile radio communication terminal 11 controls the communication module 30 and, with the output to the communication antenna 31 maintained at a predetermined value, sends the response signal to the in-vehicle communication device 10 as the measuring signal (step S6).

When, the response signal is received, the in-vehicle device 15 measures the distance to the authenticated mobile radio communication terminal 11 (step S7). To do so, the in-vehicle device 15 acquires the reception radio wave intensity (for example, "−30 dB") of the response signal, detected by the reception intensity detection unit 14, and measures the distance as described above based on this reception radio wave intensity. After that, the in-vehicle device 15 determines whether the mobile radio communication terminal 11 is within area Z that is within a predetermined distance from the vehicle 100 (see FIG. 2). For example, if the operation detection unit 17 detects a door handle operation when the mobile radio communication terminal 11 in area Z, the door lock control unit 18 unlocks the door. For example, if the mobile radio communication terminal 11 gets out of area Z with the door unlocked, the door lock control unit 18 locks the door.

As described above, the radio communication system for vehicles and its distance measuring method in this embodiment give the following effects. (1) The in-vehicle device 15 sends the output intensity maintaining request, which sets the sending radio wave intensity to a pre-set intensity, to the authenticated mobile radio communication terminal 11. This request sets the sending radio wave intensity of the response signal, which is sent from the mobile radio communication terminal 11 to the in-vehicle device 15, at a level. Therefore, even if the mobile radio communication terminal 11 has the general-purpose communication function that makes variable the sending radio wave intensity, this mobile communication system makes it possible to accurately measure the distance to the mobile radio communication terminal 11 using its general-purpose communication.

(2) The in-vehicle device 15 outputs the above-described output intensity maintaining request only to the authenticated mobile radio communication terminal 11. This prevents unnecessary output control from being performed for the external radio communication terminal 101 that is present around the vehicle but is not authenticated.

(Second Embodiment)

Next, a second embodiment of a radio communication system and its distance measuring method is described with emphasis on the difference from the first embodiment. Note that the basic configuration of the radio communication system and its distance measuring method in this embodiment is similar to that of the first embodiment. In the drawings, the same reference numeral is given to substantially the same component as that in the first embodiment, and the duplicated description will be omitted.

As shown in FIG. 4, the in-vehicle communication unit 12 of the vehicle 100 may have a reception intensity detection unit for controlling the radio wave sending range but may have a reception intensity detection unit omitted that is provided only for measuring the distance. In addition, the in-vehicle communication unit 12 has the function to control the output to the in-vehicle communication antenna 13.

Figure 5:
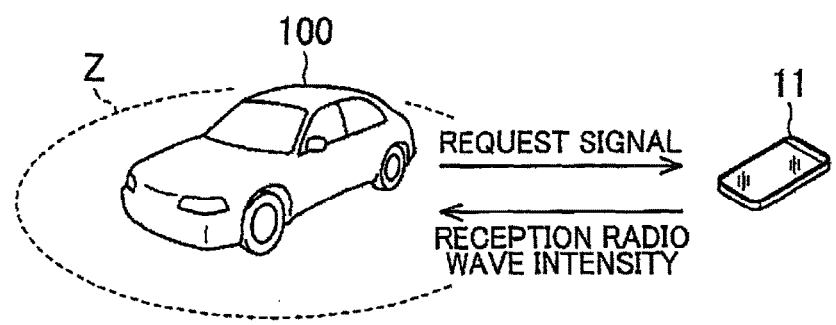
FIG. 5 is a schematic diagram showing a method of radio communication between an in-vehicle communication device and a mobile radio communication terminal in the embodiment.

The communication module 30 of the mobile radio communication terminal 11 has a reception intensity detection unit 35 that detects the reception radio wave intensity of a signal sent from the in-vehicle communication unit 12. In addition, as shown in FIG. 5, when the request signal is received from the in-vehicle device 15, the application execution unit 32 of the mobile radio communication terminal 11 controls the reception intensity detection unit 35 to acquire the radio wave intensity of the received request signal. After that, using the communication module 30, the application execution unit 32 sends the information, which indicates the detected reception radio wave intensity, as well as the slave ID to the in-vehicle communication device 10. The in-vehicle device 15 measures the distance based on the information on the reception radio wave intensity sent from the mobile radio communication terminal 11. That is, instead of detecting the intensity of the signal, sent from the electronic key terminal, on the vehicle side as in the conventional electronic key system, the radio Wave intensity of the signal, sent from the vehicle 100 side and received by the mobile radio communication terminal 11, is fed back to the in-vehicle communication device 10 for measuring the distance.

Figure 6:
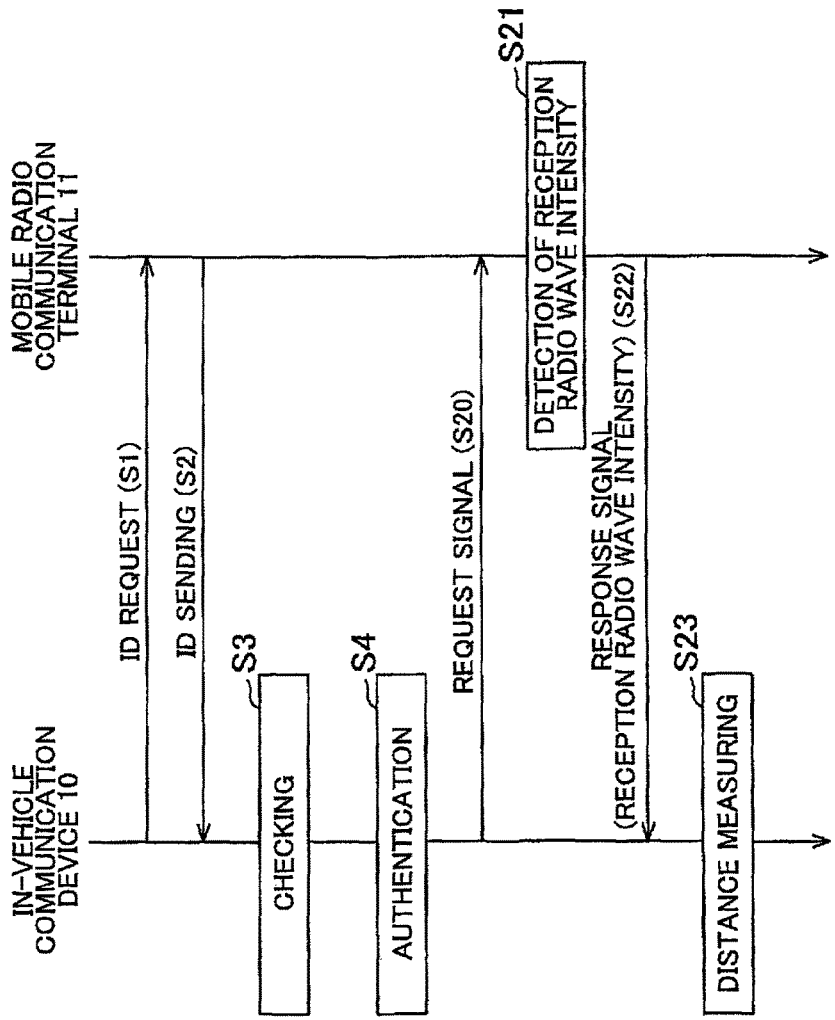
FIG. 6 is a sequence chart showing a procedure of radio communication performed by an in-vehicle communication device and a mobile radio communication terminal in the embodiment.

Next, with reference to FIG. 6, the distance measuring operation performed by the in-vehicle communication device 10 in this embodiment to measure the distance to the mobile radio communication terminal 11 is described below. The ID request (step S1) and the ID transmission (step S2)

are performed between the in-vehicle device 15 and the mobile radio communication terminal 11 as in the first embodiment.

After that, the in-vehicle device 15 performs the checking (step S3) and the authentication (step S4) as in the first embodiment.

Next, via the in-vehicle communication unit 12, the in-vehicle device 15 sends the request signal, which. requests for the reception radio wave intensity, to the authenticated mobile radio communication terminal 11 as the distance measuring signal with the output to the in-vehicle communication antenna 13 set to a predetermined output level (step S20).

When the request signal is received, the application execution unit 32 controls the communication module 30 to detect the reception radio wave intensity of the request signal (step S21). After that, the application execution unit 32 sends the response signal, which includes the information on the detected reception radio wave intensity and the slave ID, to the in-vehicle device 15 (step S22).

When the response signal, which includes the information on the reception radio wave intensity, is received, the in-vehicle device 15 references the value of the reception radio wave, intensity, included in the response signal, and the table or the map described above and measures the distance to the mobile radio communication terminal 11 (step S23).

In this manner, the mobile radio communication terminal 11, with no limitation on the communication function that makes variable the sending radio wave intensity, can unlock/lock the door and start the engine while maintaining the original general-purpose communication function.

As described above, the radio communication system for vehicles and its distance measuring method in this embodiment give the following effects. (3) The reception intensity of the radio wave, sent from the in-vehicle communication device 10 to the mobile radio communication terminal 11 with a predetermined intensity, is detected by the mobile radio communication terminal 11 and its intensity information is returned to the in-vehicle communication device 10. This method allows the vehicle side to measure the distance to the mobile radio communication terminal 11 based on the value of the reception radio wave intensity without having to control the sending radio wave intensity of the mobile radio communication terminal 11. Therefore, even if the mobile radio communication terminal 11 has the general-purpose communication function that makes variable the sending radio wave intensity, this mobile communication system makes it possible to accurately measure the distance to the mobile radio communication terminal 11 using its general-purpose communication. In addition, the mobile radio communication terminal 11, which has no limitation on the sending radio wave intensity, can maintain its original general-purpose communication function.

(Third Embodiment)

Next, a third embodiment of a radio communication system and its distance measuring method is described with emphasis on the difference, from the first embodiment. Note that the basic configuration of the radio communication system and its distance measuring method in this embodiment is similar to that of the first embodiment. In the drawings, the same reference numeral is given to substantially the same component as that in the first embodiment, and the duplicated description will be omitted.

Figure 7:
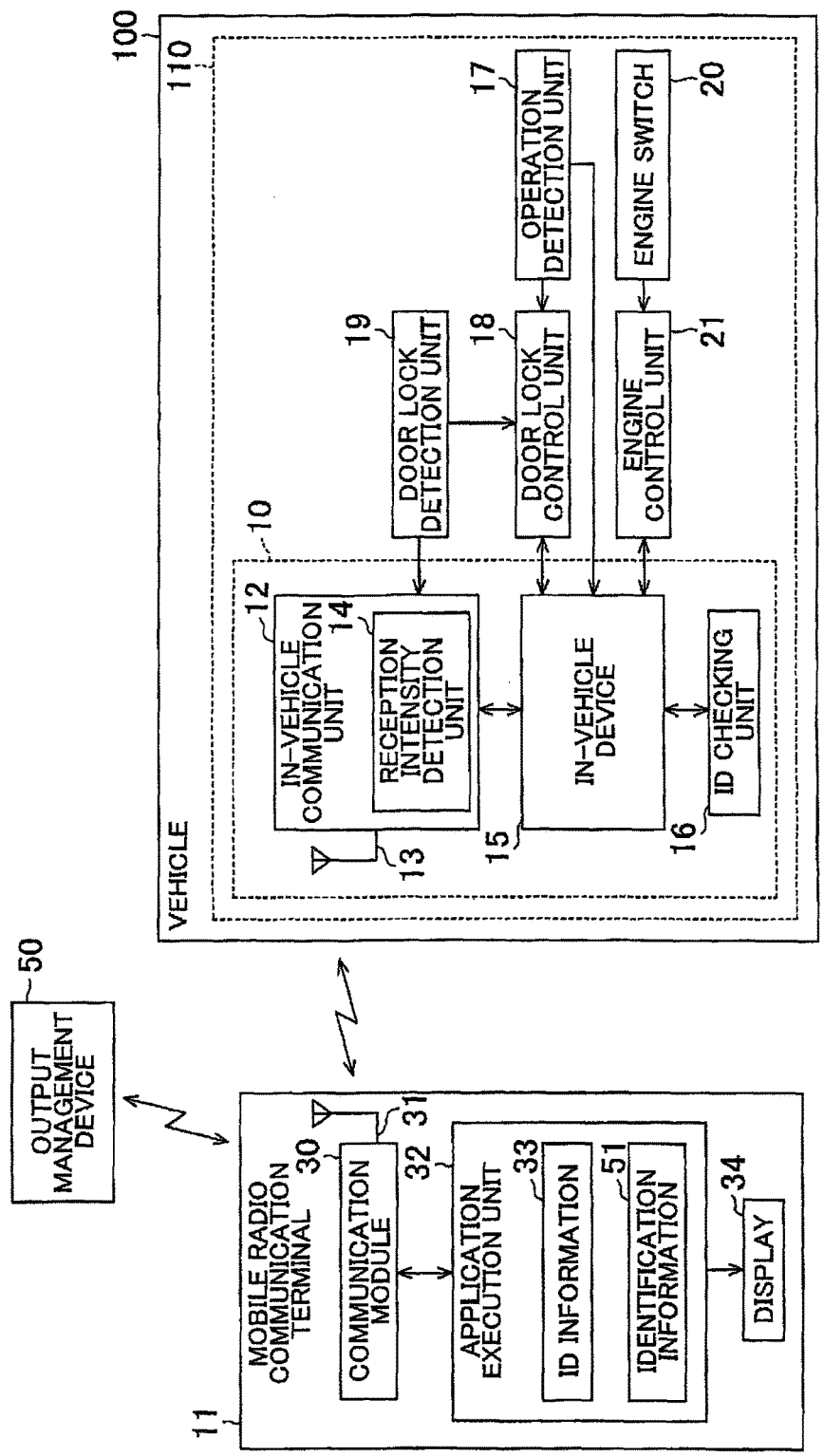
FIG. 7 is a block diagram showing a general configuration of an in-vehicle radio communication system and a mobile radio communication terminal in a third embodiment of a radio communication system and its distance measuring method of the Present invention.

As shown in FIG. 7, the mobile radio communication terminal 11 communicates also with an output management device 50, an output control unit capable of communication via Bluetooth (registered trademark), in this embodiment. In the mobile radio communication terminal 11, identification information 51 is registered to indicate that the application for the electronic key system is installed. In other words, all mobile radio communication terminals 11, in which the application for the electronic key system is installed, have this identification information 51. The output management device 50 sends a message to the surrounding external radio communication terminals 101 to ask whether they have the identification information 51. When the identification information 51 is received from the external radio communication terminal 101, the output management device 50 identifies that the application for the electronic key system is installed in that external radio communication terminal 101.

In addition, the output management device 50 sends the output intensity maintaining request to all mobile radio communication terminals 11 each of which has the application for the electronic key system. This output management device 50, usually installed at the entrance of a parking lot, controls the output of the mobile radio communication terminal 11 before the user approaches the vehicle 100.

Figure 8:
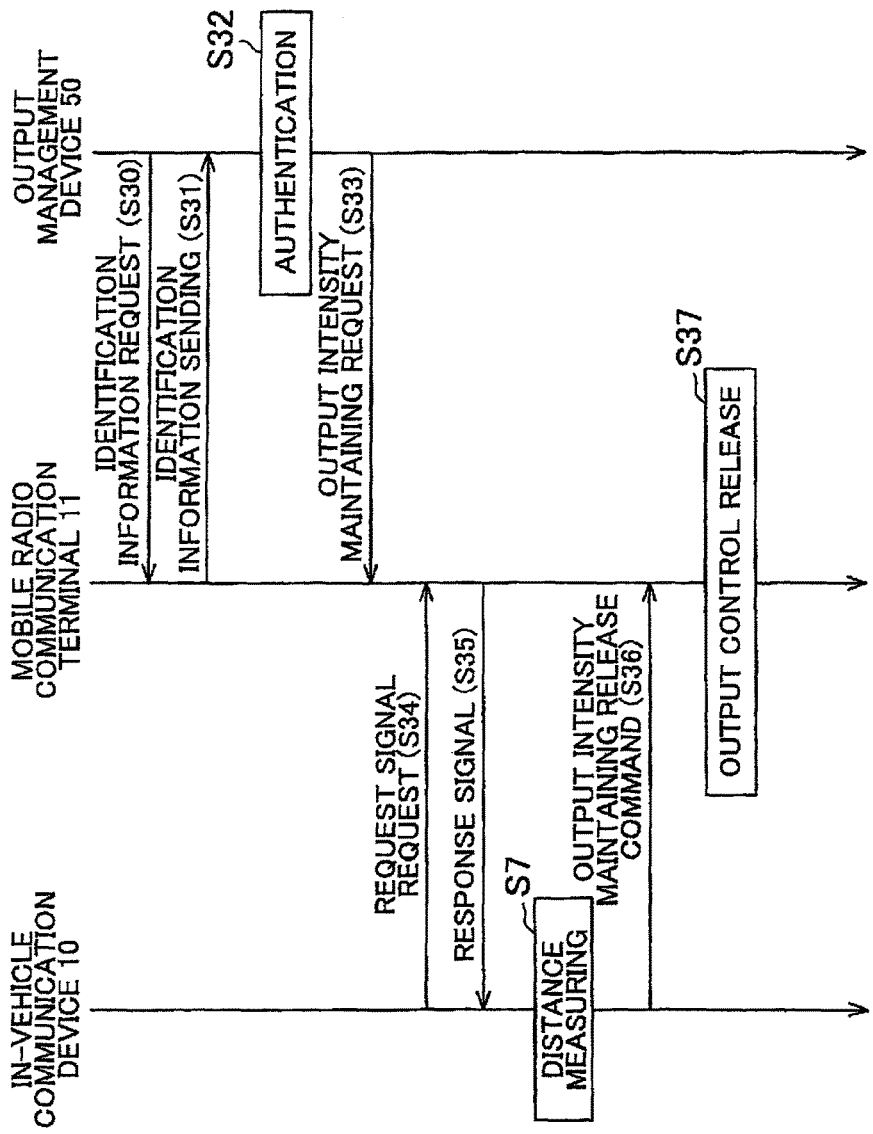
FIG. 8 is a sequence chart showing a procedure of radio communication performed by an in-vehicle communication device and a mobile radio communication terminal in the embodiment.

Next, with reference to FIG. 8, the distance measuring operation performed by the in-vehicle communication device 10 in this embodiment to measure the distance to the mobile radio communication terminal 11 is described below. The output management device 50 sends a request for the identification information 51 to the surrounding external radio communication terminals 101 (step S30). The mobile radio communication terminal 11, which has the identification information 51, sends its identification information 51 to the output management device 50 with the slave ID attached (step S31).

The output management device 50 checks. the identification information 51 for authentication (step S32). After successful authentication, the output management device 50 sends the above-described output intensity maintaining request to the mobile radio communication terminal 11 from which the identification information 51 is received (step S33). When the output intensity maintaining request is received, the mobile radio communication terminal 11 sets the output to the communication antenna 31 to a predetermined output level.

After that, when the user carrying the mobile radio communication terminal 11 approaches the vehicle 100, pairing is established between the mobile radio communication terminal 11 and the in-vehicle communication unit 12. The in-vehicle device 15 sends the request signal, which requires a response signal, to the mobile radio communication terminal 11 (step S34). When the request signal is received, the mobile radio communication terminal 11 sends the response signal to the in-vehicle communication device 10 (step S35). The reception intensity detection unit 14 of the in-vehicle communication unit 12 detects the reception radio wave intensity of the response signal and measures the distance to the mobile radio communication terminal 11 (step S7). After distance measuring is completed, the application execution unit 32 sends the output control release request to the mobile radio communication terminal 11 via the communication module 30 (step S36). When the output control release request is received, the mobile radio communication terminal 11 releases the limitation on the output to the communication antenna 31 (step S37).

As described above, the radio communication system for vehicles and its distance measuring method in this embodiment give the effect, described in (1) above, as well as the following effects.

(4) The output management device 50 sends the above-described output control signal to all mobile radio communication terminals 11 each of which has the identification information 51. This at least prevents the request, which sets the sending radio wave intensity to a predetermined level, from being sent to the mobile radio communication terminal 11 that has not the identification information 51. In this manner, the output management device 50 performs the output control of the mobile radio communication terminal 11 in advance before measuring the distance, reducing the operation load on the in-vehicle device 15.

(Other Embodiments)

The above embodiments may be implemented also in the following mode.

In the second embodiment, if the request signal is received, the application execution unit 32 detects the reception radio wave intensity of the request signal. Instead of this, the request signal, sent from the in-vehicle device 15, may include a command, which detects the reception radio wave intensity and sends the detected intensity back to the in-vehicle device 15, so that this command detects the reception radio wave intensity.

The identification information 51 in the third embodiment may be the ID information 33 on the electronic key system. The condition for locking/unlocking the door of the vehicle 100 and for starting the engine is not limited to the condition described in the embodiments described above but may be changed. For example, the door may be unlocked only on condition that the mobile radio communication terminal 11 is successfully authenticated or on condition that the relative distance between the authenticated mobile radio communication terminal 11 and the vehicle 100 is a predetermined distance or shorter. In addition, the engine may be started based not only on the operation to turn on the engine switch 20 but also on the time the ignition switch is turned on.

The in-vehicle communication unit 12 and the communication module 30 of the mobile radio communication terminal 11 may catty out communication based on the Wireless Fidelity (Wi-Fi, registered trademark) Communication protocol conforming to the IEEE.802.11 standard. In this case, the in-vehicle communication unit 12 and the mobile radio communication terminal 11 perform terminal-to-terminal communication (peer-to-peer communication) that does not require an intermediate node 5, such as a router. In addition, the in-vehicle communication unit 12 and the communication module 30 of the mobile radio communication terminal 11 may carry out communication based on other radio communication standards such as Infrared Data Association (IrDA) or ZigBee (registered trademark).

The radio communication terminal that communicates with the in-vehicle device 15 is not limited to a smartphone. The radio communication terminal may be any device that has the general-purpose communication function, for example, a music player, a headphone, or a wrist watch may be used.

Although embodied in the electronic key system in this embodiment, the radio communication system may embodied in other systems that require distance measuring, for example, in a system for starting the air conditioner in a vehicle before riding in the vehicle or in a car finder system for detecting the. position of the user's vehicle.

The invention claimed is:

1. A radio communication system in which radio communication is carried out between an in-vehicle communication device, mounted in a vehicle, and a radio communication terminal to detect a relative distance therebetween, the radio communication system comprising:
    an output control unit configured to send an output intensity maintaining request that requests a sending radio wave intensity of the radio communication terminal be maintained at a predetermined intensity;
    a communication portion, provided in the radio communication terminal, configured to: communicate according to a protocol of general-purpose communication network, make variable the sending radio wave intensity, set the sending radio wave intensity at predetermined intensity when the output intensity maintaining request is received, and send a measuring signal according to the protocol; and
    a measuring unit, provided in the in-vehicle communication device, configured to calculate a distance to the radio communication terminal based on a reception radio wave intensity of the measuring signal that is sent from the radio communication terminal with the predetermined intensity.

2. The radio communication system according to claim 1, wherein
    the output control unit is further configured to send the output intensity maintaining request to an authenticated radio communication terminal.

3. The radio communication system according to claim 1, wherein
    the output control unit, provided outside the vehicle, is further configured to send the output intensity maintaining request to all the radio communication terminals each of which has identification information indicating that the radio communication terminal is capable of communicating with the in-vehicle communication device.

4. The radio communication system according to claim 1, wherein
    the output control unit is further configured to send a request, which requests for a profile that indicates whether the radio communication terminal has an application for measuring between the in-vehicle communication device and the radio communication terminal, to the radio communication terminal,
    the output control unit selects the radio communication terminal that has the application based on the profile acquired from the radio communication terminal,
    the output control unit authenticate the radio communication terminal.

5. The radio communication system according to claim 1, wherein
    the communication portion is further configured to communicate based on a protocol of Bluetooth or a protocol of Wi-Fi.

6. A distance measuring method for carrying out radio communication between an in-vehicle communication device, mounted in a vehicle, and a radio communication terminal to detect a relative distance therebetween, the distance measuring method comprising:
    sending an output intensity maintaining request that requests a sending radio wave intensity of the radio communication terminal be maintained at a predetermined intensity, an output control unit provided in a portion other than the radio communication terminal, the radio communication terminal communicating according to a protocol of general-purpose communication network, making variable the sending radio wave intensity, setting the sending radio wave intensity at predetermined intensity when the output intensity maintaining request is received, sending a measuring signal according to the protocol, and calculating a distance to the radio communication terminal based on a reception radio wave intensity of the measuring signal that is sent from the radio communication terminal with the predetermined intensity.

\* \* \* \* \*